(12) United States Patent
Larson et al.

(10) Patent No.: US 11,192,831 B2
(45) Date of Patent: Dec. 7, 2021

(54) PRECURSOR FORMULATIONS OF A SOLID PROPELLANT, SOLID PROPELLANTS INCLUDING A REACTION PRODUCT OF THE PRECURSOR FORMULATION, ROCKET MOTORS INCLUDING THE SOLID PROPELLANT, AND RELATED METHODS

(71) Applicant: Northrop Grumman Systems Corporation, Falls Church, VA (US)

(72) Inventors: Robert S. Larson, Harrisville, UT (US); Royce Beal, Bear River City, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 646 days.

(21) Appl. No.: 15/649,105

(22) Filed: Jul. 13, 2017

(65) Prior Publication Data
US 2019/0016645 A1    Jan. 17, 2019

(51) Int. Cl.
| | | |
|---|---|---|
| *C06B 23/00* | (2006.01) | |
| *C06B 29/22* | (2006.01) | |
| *F02K 9/08* | (2006.01) | |
| *B64G 1/40* | (2006.01) | |
| *F02K 9/26* | (2006.01) | |

(52) U.S. Cl.
CPC ............ *C06B 23/007* (2013.01); *B64G 1/403* (2013.01); *C06B 29/22* (2013.01); *F02K 9/08* (2013.01); *F02K 9/26* (2013.01); *F05D 2220/80* (2013.01)

(58) Field of Classification Search
None
See application file for complete search history.

(56) References Cited

U.S. PATENT DOCUMENTS

| | | | |
|---|---|---|---|
| 4,485,211 A * | 11/1984 | Okamoto | ........... C08G 18/4862 525/349 |
| 4,632,715 A | 12/1986 | Curtis | |
| 5,334,270 A | 8/1994 | Taylor, Jr. | |
| 5,985,361 A | 11/1999 | Poulter et al. | |

(Continued)

FOREIGN PATENT DOCUMENTS

| | | |
|---|---|---|
| WO | 2015042640 A1 | 4/2015 |
| WO | 2015097433 A1 | 7/2015 |
| WO | 2016185172 A1 | 11/2016 |

OTHER PUBLICATIONS

Croda, Priplast Bio-based and flexible polyols for high performance polyurethanes, 2009 Publication POLYCO/EU/03-09/0.25K/DD, 8 pages.

(Continued)

*Primary Examiner* — Aileen B Felton
(74) *Attorney, Agent, or Firm* — TraskBritt (57) ABSTRACT

A precursor formulation comprising, before curing, a hydroxyl-terminated polybutadiene (HTPB) prepolymer or a hydroxyl-terminated polyether (HTPE) prepolymer, an oxidizer, a dimer fatty diol, and an isocyanate curative. A solid propellant comprising a reaction product of the HTPB prepolymer or HTPE prepolymer, the dimer fatty diol, and the isocyanate curative is also disclosed, as is a rocket motor comprising a case and a solid propellant in the case, the solid propellant comprising the reaction product and an oxidizer. A method of reducing a burn rate of a solid propellant is also disclosed.

20 Claims, 7 Drawing Sheets

(56) References Cited

U.S. PATENT DOCUMENTS

| | | |
|---|---|---|
| 6,217,682 B1 | 4/2001 | Campbell |
| 7,112,706 B2 | 9/2006 | Koresawa et al. |
| 8,051,640 B2 | 11/2011 | Geisler et al. |
| 2016/0221888 A1 | 8/2016 | Warrender et al. |
| 2016/0221889 A1 | 8/2016 | Warrender et al. |
| 2016/0244382 A1 | 8/2016 | Warrender et al. |
| 2019/0077725 A1* | 3/2019 | Doll ..................... C06B 31/08 |

OTHER PUBLICATIONS

PRIPOL Polymerised fatty acids data sheet, CRODA © 2008 BOND/EU/10-07, 1001/E&0.25K/DD, 2 pages.

Smits "Bio-based Solutions for High-Performance Polyurethane Adhesives" CRODA Bio-based Adhesives Conference 2013, 18 pages.

* cited by examiner

(representative dimer acid)

(representative dimer diol)

FIG. 4

HTPB/dimer fatty diol/IPDI Reaction Product

FIG. 5

HTPB

DDI

HTPB/DDI Reaction Product

PRECURSOR FORMULATIONS OF A SOLID PROPELLANT, SOLID PROPELLANTS INCLUDING A REACTION PRODUCT OF THE PRECURSOR FORMULATION, ROCKET MOTORS INCLUDING THE SOLID PROPELLANT, AND RELATED METHODS

TECHNICAL FIELD

Embodiments of the disclosure relate to a precursor formulation of a solid propellant for use in an article and to methods of reducing a burn rate of the solid propellant. More particularly, embodiments of the disclosure relate to a precursor formulation of a solid propellant comprising a dimer fatty diol, the solid propellant comprising a reaction product of the precursor formulation, and a rocket motor or other article comprising the solid propellant, as well as methods of reducing the burn rate of the solid propellant.

BACKGROUND

Solid propellants are used in rocket motors to provide thrust for attaining rocket motor propulsion. A conventional solid propellant includes a fuel, an oxidizer, a binder, and a curing agent, such as a curative. The solid propellant is formulated to provide, during combustion, the thrust for attaining rocket motor propulsion. Burn rate of the solid propellant is an important property to achieve the desired thrust, and the rocket motor may be configured to operate with a low burn rate solid propellant or a high burn rate solid propellant. During combustion, the solid propellant should burn at a controlled and predictable rate. Generally, higher burn rates produce pressures with a case of the rocket motor that may lead to damage of the rocket motor, while lower burn rates lead to insufficient thrust to propel the rocket motor. Conventionally, the burn rate of the solid propellant is controlled by including a burn rate modifier, such as a burn rate suppressant, in the solid propellant.

The solid propellant is prepared from a precursor formulation that has been cured. One widely-used solid propellant includes aluminum as the fuel, ammonium perchlorate (AP) as the oxidizer, and a hydroxyl-terminated polybutadiene (HTPB) as the binder. Dimeryl diisocyanate (DDI) is a difunctional isocyanate and is used as a urethane curative for the HTPB. During cure, the DDI reacts with hydroxyl groups of the HTPB to form a reaction product having two urethane linkages. In addition to its curative properties, DDI functions as a burn rate suppressant in the solid propellant compared to other diisocyanates that function solely as curatives. However, DDI is difficult and expensive (greater than about $80/lb) to produce and, therefore, has a high risk of obsolescence due to a domestic manufacturer's decision to discontinue its production.

The effect of average particle size and distribution of AP has also been investigated to reduce the burn rate of the solid propellant. While a reduction in burn rate is achieved, this is not a reproducible or viable solution due to the associated cost and problems with processing formulations including larger particle sizes of AP. DDI has also been partially replaced with other burn rate suppressants in the solid propellant. However, these burn rate suppressants reduce the performance of the solid propellant and increase the complexity of formulating the solid propellant.

BRIEF SUMMARY

Disclosed is an embodiment of a precursor formulation comprising, before cure, a hydroxyl-terminated polybutadiene (HTPB) prepolymer or a hydroxyl-terminated polyether (HTPE) prepolymer, an oxidizer, a dimer fatty diol, and an isocyanate curative.

A solid propellant is also disclosed and comprises a reaction product of the HTPB prepolymer or the HTPE prepolymer, the dimer fatty diol, and the isocyanate curative, and an oxidizer.

A rocket motor is also disclosed and comprises a case and a solid propellant in the case. The solid propellant comprises the reaction product of the HTPB prepolymer or the HTPE prepolymer, the dimer fatty diol, and the isocyanate curative, and the oxidizer.

A method of reducing a burn rate of the solid propellant is also disclosed. The method comprises combining the dimer fatty diol with the HTPB prepolymer or HTPE prepolymer, the oxidizer, and the isocyanate curative to form a precursor formulation and curing the precursor formulation to form a solid propellant.

BRIEF DESCRIPTION OF THE DRAWINGS

FIGS. 1A-1F show representative, general chemical structures of a dimer fatty diol according to embodiments of the disclosure;

DETAILED DESCRIPTION

A precursor formulation of a solid propellant is disclosed, where the precursor composition includes a prepolymer, an oxidizer, a burn rate suppressant, and an isocyanate curative. A fuel may, optionally, be present in the precursor formulation. The burn rate suppressant is a dimer fatty diol having a chemical structure similar to DDI. Curing the precursor formulation produces the solid propellant according to embodiments of the disclosure, which is used to provide thrust for a rocket motor or other article. The solid propellant includes a reaction product of the prepolymer, the dimer fatty diol, and the isocyanate curative, with the oxidizer dispersed in the reaction product. This reaction product is similar in chemical structure (i.e., structurally similar) to a reaction product of a DDI-containing solid propellant that includes the prepolymer, DDI, and the isocyanate curative.

The dimer fatty diol reduces the burn rate of the solid propellant compared to a similar solid propellant lacking the dimer fatty diol. The solid propellant according to embodiments of the disclosure also has a comparable or reduced burn rate compared to a solid propellant that includes DDI. The comparable or reduced burn rate is achieved without exhibiting negative impact on performance of the solid propellant in the rocket motor. Therefore, the dimer fatty diol exhibits a similar effect on burn rate suppression as DDI. By utilizing the dimer fatty diol, DDI may be reduced or eliminated from the solid propellant. Utilizing the dimer fatty diol also minimizes substantial reformulation of the solid propellant.

As used herein, the term "precursor formulation" means and includes components of the solid propellant before the components are reacted (e.g., cured). In other words, the precursor formulation includes the components of the solid propellant before the reaction product is formed. The components of the precursor formulation may be commercially available.

As used herein, the term "dimer fatty diol" means and includes an aliphatic compound having from 16 carbon atoms to 54 carbon atoms, and at least one hydroxyl group attached to an alkyl group, alkenyl group, cycloalkyl group, cycloalkenyl group, bicycloalkyl group, bicycloalkenyl group, or aromatic group by hydrocarbon chains (HC). The dimer fatty diol may also be referred to as a dimer diol. By way of example only, the aliphatic compound may have from 30 carbon atoms to 40 carbon atoms, such as from 32 carbon atoms to 37 carbon atoms. Representative chemical structures of the dimer fatty diol are shown in FIGS. 1A-1F, where the aliphatic compound is a cyclohexyl group, a cyclohexyl group with one double bond, a bicyclic cyclohexyl group, or a phenyl group, "HC—OH" represents a hydroxyl-terminated hydrocarbon chain and "HC" represents an additional hydrocarbon chain. At least one additional hydrocarbon chain may be present on the dimer fatty diol. The dimer fatty diol includes at least one hydroxyl-terminated hydrocarbon chain, such as two hydroxyl-terminated hydrocarbon chains, bonded to the alkyl group, alkenyl group, cycloalkyl group, cycloalkenyl group, bicycloalkyl group, bicycloalkenyl group, or aromatic group. If the dimer fatty diol includes the cycloalkyl group, between one additional hydrocarbon chain and four additional hydrocarbon chains may be present on the dimer fatty diol. If the dimer fatty diol includes the cycloalkenyl group, one additional hydrocarbon chain or two additional hydrocarbon chains may be present on the dimer fatty diol. Since the dimer fatty diols are produced from naturally-occurring starting products, the dimer fatty diol may also include one or more of a monomer polyol, a fractional polyol, or a trimer polyol.

Figures 1A, 1F:
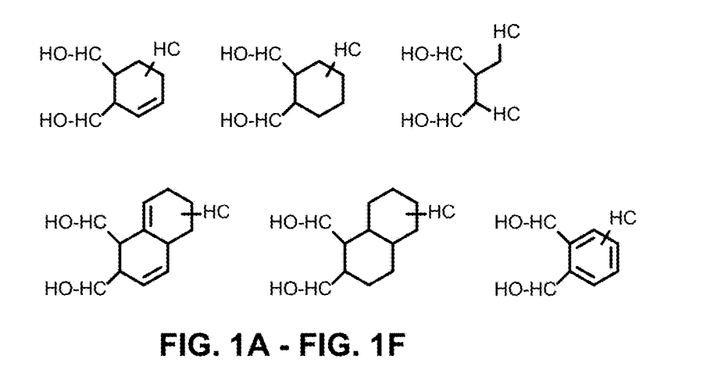
Figure 2A:
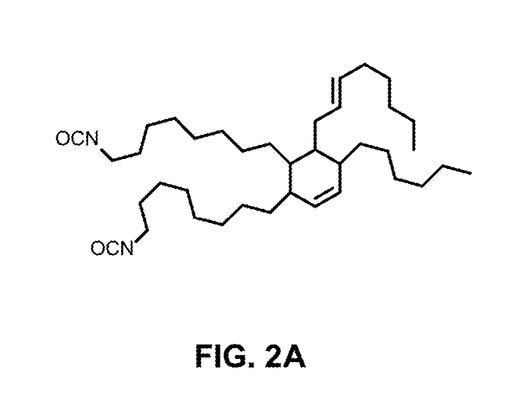
FIGS. 2A and 2B show representative chemical structures of dimeryl diisocyanate (DDI)
Figure 2B:
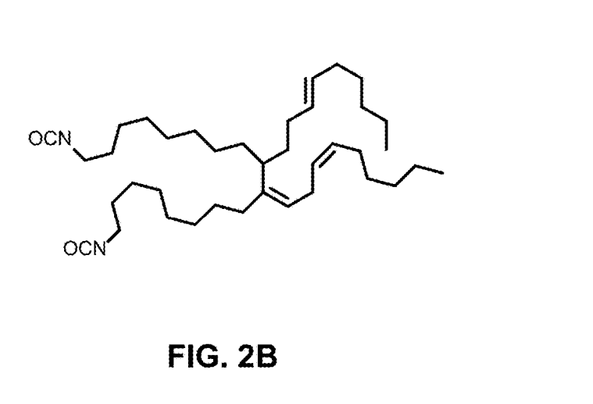

As used herein, the term "structurally similar" means having a chemical structure similar to that of DDI. Representative chemical structures of DDI are shown in FIGS. 2A and 2B. Since DDI is produced from naturally-occurring starting products (e.g., natural fatty acids), which vary in chemical makeup, the chemical structures of DDI in FIGS. 2A and 2B are representative and are not indicative of actual chemical structures. The dimer fatty diol may differ from DDI merely in the identity of the functional groups on the at least one of the hydrocarbon chains. By way of example only, and as shown in FIGS. 2A, 2B, 3A, and 3B, the dimer fatty diol may include two hydroxyl groups on the hydrocarbon chains instead of two isocyanate groups as in DDI. However, and as explained in more detail below, the dimer fatty diol may include aliphatic compounds having more carbon atoms in the hydrocarbon chains or less carbon atoms in the hydrocarbon chains compared to DDI, a different extent of branching of the hydrocarbon chains compared to DDI, or a different number to carbon atoms in the cycloalkyl group or cycloalkenyl group. By utilizing an aliphatic compound structurally similar to DDI, the reaction product of the precursor formulation according to embodiments of the disclosure may be structurally similar to the reaction product of a DDI-containing solid propellant that includes the prepolymer, DDI, and the isocyanate curative.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

The illustrations presented herein are not meant to be actual views of any particular article or rocket motor, but are merely idealized representations that are employed to describe the present disclosure. The figures are not necessarily drawn to scale. Additionally, elements common between figures may retain the same numerical designation.

Figure 3A:
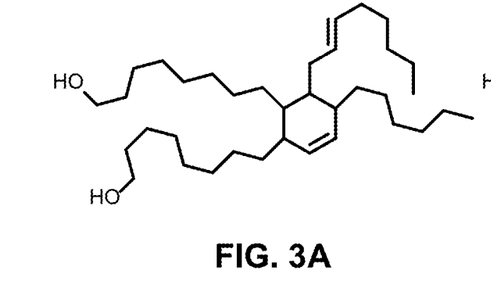
FIGS. 3A and 3B show representative chemical structures of a dimer fatty diol according to embodiments of the disclosure.
Figure 3B:
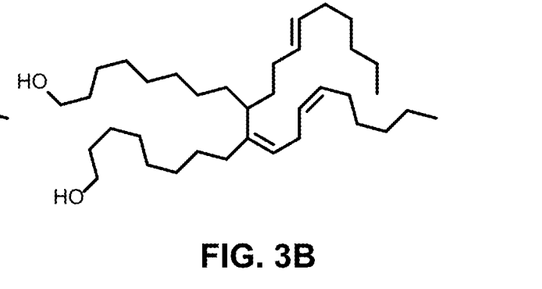

The dimer fatty diol is a derivative of a dimerized fatty acid and may include from 16 carbon atoms to 54 carbon atoms, such as from 30 carbon atoms to 40 carbon atoms, from 32 carbon atoms to 38 carbon atoms, from 33 carbon atoms to 37 carbon atoms, from 35 carbon atoms to 40 carbon atoms, or from 35 carbon atoms to 38 carbon atoms. In some embodiments, the dimer fatty diol includes 36 carbon atoms. The dimer fatty diol may be an aliphatic compound having the alkyl group, alkenyl group, cycloalkyl group, cycloalkenyl group, bicycloalkyl group, bicycloalkenyl group, or aromatic group, the at least one hydroxyl-terminated hydrocarbon chain bonded to the alkyl group, alkenyl group, cycloalkyl group, cycloalkenyl group, bicycloalkyl group, bicycloalkenyl group, or aromatic group, and optional additional hydrocarbon chains bonded to the alkyl group, alkenyl group, cycloalkyl group, cycloalkenyl group, bicycloalkyl group, bicycloalkenyl group, or aromatic group. The cycloalkyl group of the dimer fatty diol may, for example, be a cyclopentyl group, a cyclohexyl group, or a cycloheptyl group. Alternatively, the dimer fatty diol may be a cyclopentenyl group, a cyclohexenyl group, or a cycloheptenyl group, in which the ring has one double bond. In some embodiments, the dimer fatty diol includes the cyclohexyl group (see FIG. 1B), the cyclohexenyl group (see FIG. 1A), or the phenyl group (see FIG. 1F). The dimer fatty diols are produced from naturally-occurring starting products (e.g., natural fatty acids), which vary in chemical makeup. Therefore, the dimer fatty diol may have a variety of chemical structures. Exemplary chemical structures of the dimer fatty diol are shown in FIGS. 3A and 3B, which are cyclic and acyclic, respectively. However, it is understood that the chemical structures in FIGS. 3A and 3B are representative and are not indicative of actual chemical structures. The dimer fatty diol may also include a mixture of the chemical structures.

The hydroxyl-terminated hydrocarbon chains of the dimer fatty diol may, independently, include from 6 carbon atoms to 10 carbon atoms, such as from 6 carbon atoms to 9 carbon atoms, from 7 carbon atoms to 9 carbon atoms, or from 7 carbon atoms to 10 carbon atoms. The hydrocarbon portions of the hydroxyl-terminated hydrocarbon chains may be linear or branched, and are saturated or unsaturated. Minimal branching is present on the hydroxyl-terminated hydrocarbon chains so that the dimer fatty diol does not crystallize. Each of the hydroxyl-terminated hydrocarbon chains may be the same as or different from one another. In some embodiments, each of the hydroxyl-terminated hydrocarbon chains includes 8 carbon atoms. As shown in FIGS. 3A and 3B, the hydroxyl-terminated hydrocarbon chains may be attached to a cyclic group or an acyclic group. While each of the hydroxyl-terminated hydrocarbon chains in FIGS. 3A and 3B include 8 carbon atoms, in other embodiments the hydroxyl-terminated hydrocarbon chains may differ in chemical structure from one another. Therefore, the hydroxyl-terminated hydrocarbon chains do not have to be identical. As shown in FIG. 3A, the hydroxyl-terminated hydrocarbon chains may be bonded to vicinal carbon atoms of the cycloalkenyl group or similarly in a cycloalkyl group or aromatic group. However, the hydroxyl-terminated hydrocarbon chains may be positioned on other carbon atoms of these functional groups. By way of example only, the hydroxyl-terminated hydrocarbon chains may be located on the C1 and C3 carbon atoms of the cyclohexyl group or cyclohexenyl group, the C2 and C4 carbon atoms of the cyclohexyl group or cyclohexenyl group, the C3 and C5 carbon atoms of the cyclohexyl group or cyclohexenyl group, the C4 and C6 carbon atoms of the cyclohexyl group or cyclohexenyl group, the C1 and C4 carbon atoms of the cyclohexyl group or cyclohexenyl group, the C2 and C5 carbon atoms of the cyclohexyl group or cyclohexenyl group, or the C3 and C6 carbon atoms of the cyclohexyl group or cyclohexenyl group.

If more than two hydrocarbon chains are present on the alkyl group, alkenyl group, cycloalkyl group, cycloalkenyl group, bicycloalkyl group, bicycloalkenyl group, or aromatic group, the additional hydrocarbon chains may be linear or branched, and may be saturated or unsaturated. By way of example only, the dimer fatty diol may include four hydrocarbon chains, two hydroxyl-terminated hydrocarbon chains and two linear hydrocarbon chains, as shown in FIGS. 3A and 3B. The two linear hydrocarbon chains may be saturated or unsaturated, as shown in FIGS. 3A and 3B, respectively. The additional hydrocarbon chains may include from 6 carbon atoms to 10 carbon atoms, such as from 6 carbon atoms to 9 carbon atoms, from 7 carbon atoms to 9 carbon atoms, or from 7 carbon atoms to 10 carbon atoms. The additional hydrocarbon chains may be independently selected. Therefore, each of the additional hydrocarbon chains may be the same as or different from one another.

The hydroxyl-terminated hydrocarbon chains and additional hydrocarbon chains of the dimer fatty diol may be selected such that the dimer fatty diol is a liquid at room temperature (between about 20° C. and about 25° C.) and has a low melting point and a low vapor pressure at room temperature. The dimer fatty diol may exhibit a boiling point of greater than about 200° C., a pour point of less than about −60° C., and a vapor pressure of less than about 0.075 mm Hg. The dimer fatty diol may also have a low viscosity at room temperature.

Dimer fatty diols are commercially available, such as from Croda Inc. (Edison, N.J.). By way of example only, the dimer fatty diol may be a C36 (thirty-six carbon atoms) dimer fatty diol sold under the PRIPOL® tradename, such as PRIPOL® 2030 or PRIPOL® 2033 (a hydrogenated C36 dimer fatty diol). PRIPOL® 2030 is a dimer diol having an acid value of 0.2 (max) mg KOH/g, and a hydroxyl value of 202-212 mg KOH/g. PRIPOL® 2033 is a dimer diol having an acid value of 0.2 (max) mg KOH/g, and a hydroxyl value of 202-212 mg KOH/g. PRIPOL® 2033 is an amorphous and hydrogenated C36 dimer fatty diol, has a molecular weight of 540 g/mol, a viscosity at 20° C. of 3650 mPa·s, and a viscosity at 80° C. of 200 mPa·s. PRIPOL® 2033 includes 2% of a monomer, 96.5% of the dimer, and 1.5% of a trimer.

Figure 4:
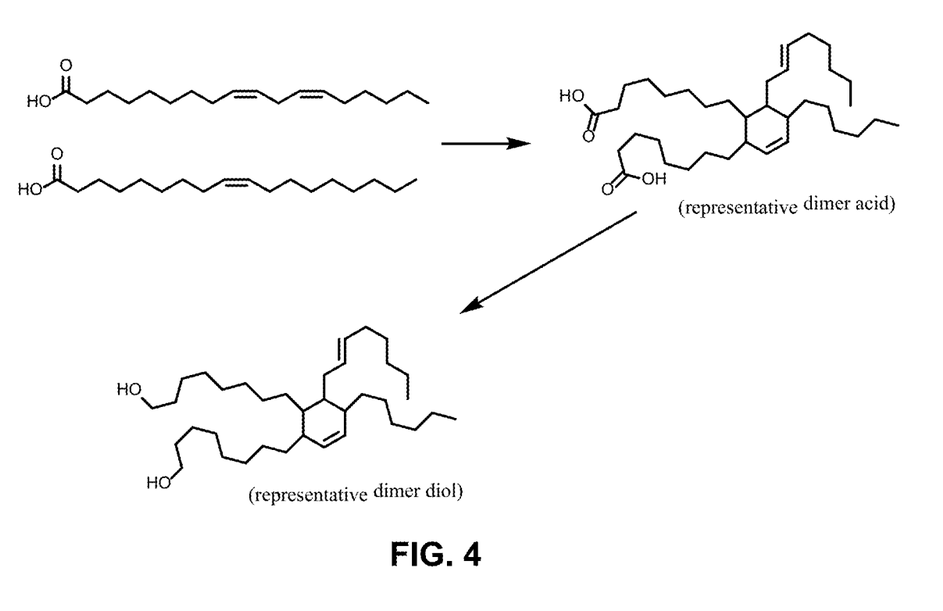
FIG. 4 shows a reaction scheme for producing a representative dimer fatty diol according to embodiments of the disclosure.

The dimer fatty diol may be easier and less expensive to produce than DDI since a simple reduction of the corresponding acid to the alcohol is needed, as shown in FIG. 4. The dimer fatty diol is formed by dimerization of a tall oil fatty acid (TOFA) to produce a dimer fatty acid, which is reduced to the dimer fatty diol. Acid functional groups of the dimer fatty acid are reduced to hydroxyl functional groups by a single step chemical reduction. The TOFA may include linoleic acid ($C_{18}H_{32}O_2$), oleic acid ($C_{18}H_{34}O_2$), palmitic acid ($C_{16}H_{32}O_2$), or combinations thereof. Since TOFAs are derived from naturally-occurring products, the TOFA includes a mixture of fatty acids having from 16 carbon atoms to 18 carbon atoms, with the fatty acids including a mixture of saturated and unsaturated compounds. Since the starting products from which the dimer fatty diol is synthesized include a variety of fatty acids, primarily linoleic acid and oleic acid, a variety of chemical structures for the dimer fatty diol are possible. Therefore, the chemical structures shown in FIGS. 3A and 3B are understood to be representative and not indicative of all of the possible chemical structures of the dimer fatty diol. In some embodiments, the TOFA includes a mixture of linoleic acid and oleic acid, so the dimer fatty diol includes 36 carbon atoms. In comparison, DDI is produced by dimerization of a TOFA to produce a dimer fatty acid, which is converted to a diisocyanate compound by a multistep synthesis. Since the starting products from which the DDI is synthesized include a variety of fatty acids, primarily linoleic acid and oleic acid, a variety of chemical structures for the DDI are possible.

The amount of dimer fatty diol may be such that no detrimental effects on processing and rheological properties of the precursor formulation are observed and the solid propellant has the desired performance properties. The dimer fatty diol is present in the precursor formulation at from about 0.01% by weight (wt %) to about 5 wt %, such as from about 0.01 wt % to about 4 wt %, from about 0.01 wt % to about 3 wt %, from about 0.01 wt % to about 2 wt %, from about 0.01 wt % to about 1 wt %, from about 0.01 wt % to about 0.8 wt %, from about 0.05 wt % to about 2 wt %, from about 0.05 wt % to about 1 wt %, from about 0.1 wt % to about 2 wt %, from about 0.1 wt % to about 1.75 wt %, from about 0.1 wt % to about 1 wt %, from about 0.3 wt % to about 1 wt %, or from about 0.5 wt % to about 1 wt %. In some embodiments, the dimer fatty diol is present at about 0.5 wt %. In other embodiments, the dimer fatty diol is present at about 1.0 wt %. The amount of dimer fatty diol present in the precursor formulation may also be expressed herein relative to the amount of isocyanate curative, e.g., by the cure ratio (moles NCO of the isocyanate curative/(moles OH of the dimer fatty diol)+(moles OH of the prepolymer)). The cure ratio may range from about 0.645 to about 1.00, such as from about 0.700 to about 0.950, from about 0.800 to about 0.940, or from about 0.870 to about 0.930. However, depending on the prepolymer in the precursor formulation, an excess of the isocyanate curative may also be used. By way of example only, if glycidyl azide polymer (GAP) or polyglycidyl nitrate (PGN) is used, the cure ratio may range from about 0.645 to about 1.30.

The prepolymer in the precursor formulation may be a hydroxyl-terminated prepolymer, such as a hydroxyl-terminated polybutadiene (HTPB), GAP, a hydroxyl-terminated polyether (HTPE), PGN, or combinations thereof. In some embodiments, the prepolymer is HTPB. In other embodiments, the prepolymer is HTPE. HTPB is commercially available as R45M from CRS Chemicals (Canoga Park, Calif.) or from Cray Valley Hydrocarbon Specialty Chemicals (Exton, Pa.) under the POLY BD® tradename. HTPE is commercially available from various sources such as DuPont (Wilmington, Del.). The precursor formulation may include from about 6.0 wt % to about 10.0 wt % of the prepolymer, such as from about 6.5 wt % to about 9.5 wt % of the prepolymer, from about 7.0 wt % to about 9.0 wt % of the prepolymer, or from about 7.5 wt % to about 8.5 wt % of the prepolymer. In some embodiments, the prepolymer is present at about 7.8 wt %, 8.8 wt %, 8.7 wt %, or 9.4 wt % of the precursor formulation.

The oxidizer may be ammonium perchlorate (AP), ammonium dinitramide (ADN), ammonium nitrate, or combinations thereof. In some embodiments, the oxidizer is AP. The oxidizer may be present in the precursor formation at from about 50 wt % to about 90 wt %, such as from about 65 wt % to about 85 wt %, from about 65 wt % to about 80 wt %, from about 65 wt % to about 75 wt %, from about 65 wt % to about 70 wt %, from about 70 wt % to about 85 wt %, from about 70 wt % to about 80 wt %, or from about 75 wt % to about 90 wt %. In some embodiments, the AP is present in the precursor formulation at about 69 wt %. The oxidizer may be present at multiple particle sizes or particle size distributions. In some embodiments, multiple particle sizes of the ammonium perchlorate are present, such as about 320 μm and about 20 μm.

The isocyanate curative may be an aliphatic isocyanate, a cycloaliphatic isocyanate, or an aromatic isocyanate, such as isophorone diisocyanate (IPDI), IPDI oligomers, methylene dicyclohexyl diisocyanate (H12MDI), hexamethylene diisocyanate (HDI), HDI oligomers, e.g., N100, N3200, Bayer, methylene diphenyl diisocyante (MDI), MDI oligomers, DDI, toluene diisocyanate (TDI), cyclohexyl diisocyanate (CHDI), tetramethyl xylene diisocyanate (TMXDI), paraphenylene diisocyanate (PPDI), or combinations thereof. The isocyanate curative has a higher functionality than that of the prepolymer. Such isocyanate curatives are commercially available from numerous sources, such as Evonik Industries AG (Marl, Germany), BASF Corp. (Florham Park, N.J.), Dow Chemical Company (Midland, Mich.), Bayer MaterialScience AG (Leverkusen, Germany), or Huntsman Corp. (The Woodlands, Tex.). In some embodiments, the isocyanate curative is IPDI. The isocyanate curative may also be used in combination with DDI. The isocyanate curative may be present in the precursor formulation at an amount sufficient to cure, e.g., crosslink, the prepolymer. The isocyanate curative may be present in the precursor formulation at from about 0.1 wt % to about 10 wt %, such as from about 0.1 wt % to about 5 wt %, from about 0.1 wt % to about 1.0 wt %, from about 0.3 wt % to about 1.0 wt %, or from about 0.5 wt % to about 1.0 wt %. The amount of isocyanate curative in the precursor formulation may be greater than the amount of DDI in a conventional precursor formulation including HTPB and DDI but lacking the dimer fatty diol.

The fuel, if present, may be a metal, such as aluminum, zirconium, magnesium, boron, or combinations thereof. In some embodiments, the fuel is aluminum. The fuel may be present in the precursor composition at from about 5 wt % to about 25 wt %, such as from about 10 wt % to about 25 wt %, from about 10 wt % to about 20 wt %, from about 15 wt % to about 25 wt %, or from about 15 wt % to about 20 wt %. In some embodiments, the fuel is present at about 19 wt % of the precursor formulation. The fuel may exhibit an average particle size of from about 15 μm to about 40 μm, such as about 25 μm.

Depending on the desired mechanical and physical properties of the solid propellant, the precursor formulation of the solid propellant may optionally include additional components, such as at least one nitramine, at least one plasticizer, at least one filler, at least one additive, at least one diluent, at least one antioxidant, at least one antiaging compound, at least one cure catalyst, at least one diluent, at least one bonding agent, at least one processing aid, at least one flame retardant, at least one co-agent, or combinations thereof. The additional components, when present, may also improve processing and curing of the precursor formulation. Such additional components are conventional and are not described in detail herein.

In some embodiments, the precursor formulation includes HTPB as the prepolymer, AP as the oxidizer, the dimer fatty diol as the burn rate suppressant, IPDI as the isocyanate curative, aluminum as the fuel, as well as a bonding agent, a plasticizer, a cure catalyst, and an antioxidant/antiaging compound. Other components may optionally be present. In some embodiments, the bonding agent is tepanol (a reaction product of tetraethylene pentamine with acrylonitrile and glycidol) and is present in the precursor formulation at from about 0.05 wt % to about 0.15 wt %, the plasticizer is dioctyl sebacate (DOS) and is present in the precursor formulation at from about 0.5 wt % to about 3.0 wt %, the cure catalyst is triphenyl bismuth (TPB) and is present in the precursor formulation at from about 0.001 wt % to about 0.02 wt %, and the antioxidant/antiaging compound is WESTON® 399.

The precursor formulation may have a high solids content, such as a solids content of greater than about 80%, a solids content of greater than about 85%, a solids content of greater than about 88%, or a solids content of greater than about 90%. If the precursor formulation includes HTPB, the solids content may be greater than or equal to about 87%. If the precursor formulation includes HTPE, the solids content may be greater than or equal to about 84%. In some embodiments, the precursor formulation has a solids content of about 88%.

The precursor formulation of the solid propellant may be produced by conventional techniques, such as by combining (e.g., mixing) the components. The prepolymer, oxidizer, dimer fatty diol, fuel if present, isocyanate curative, and any optional components may be combined in any order to produce the precursor formulation, except that the isocyanate curative, e.g., IPDI, may be added last to prevent premature curing. Since the dimer fatty diol is a liquid, the dimer fatty diol may be easily combined with the prepolymer, oxidizer, and fuel if present, at the beginning of processing. The precursor formulation may be produced using conventional processing conditions, such as a conventional processing temperature (e.g., a temperature of greater than or equal to about 25° C.) and processing time. The components are combined in a mixer, such as an internal mixer, to form a substantially homogeneous precursor formulation. The dimer fatty diol may be homogeneously dispersed throughout the propellant. Since the dimer fatty diol is compatible with the other components of the precursor formulation, no detrimental effects on processing are observed by incorporating the dimer fatty diol into the precursor formulation. Since the dimer fatty diol does not affect the rheological properties of the precursor formulation, the precursor formulation may be processed without substantial changes to its processing. By way of example only, the viscosity of the precursor formulation may be substantially similar to the viscosity of a conventional precursor formulation lacking the dimer fatty diol, such as from about 1 kP to about 15 kP at about 25° C.

After adding the isocyanate curative, the precursor formulation may be formed into grains and cured, forming grains of the solid propellant. By way of example only, the grains of the solid propellant may be cast into a mold and cured by conventional techniques, which are not described in detail herein. The curing may occur at room temperature or may be accelerated by applying at least one of heat and pressure as known in the art. The grains of solid propellant may then be loaded into the rocket motor by conventional techniques.

Figure 5:
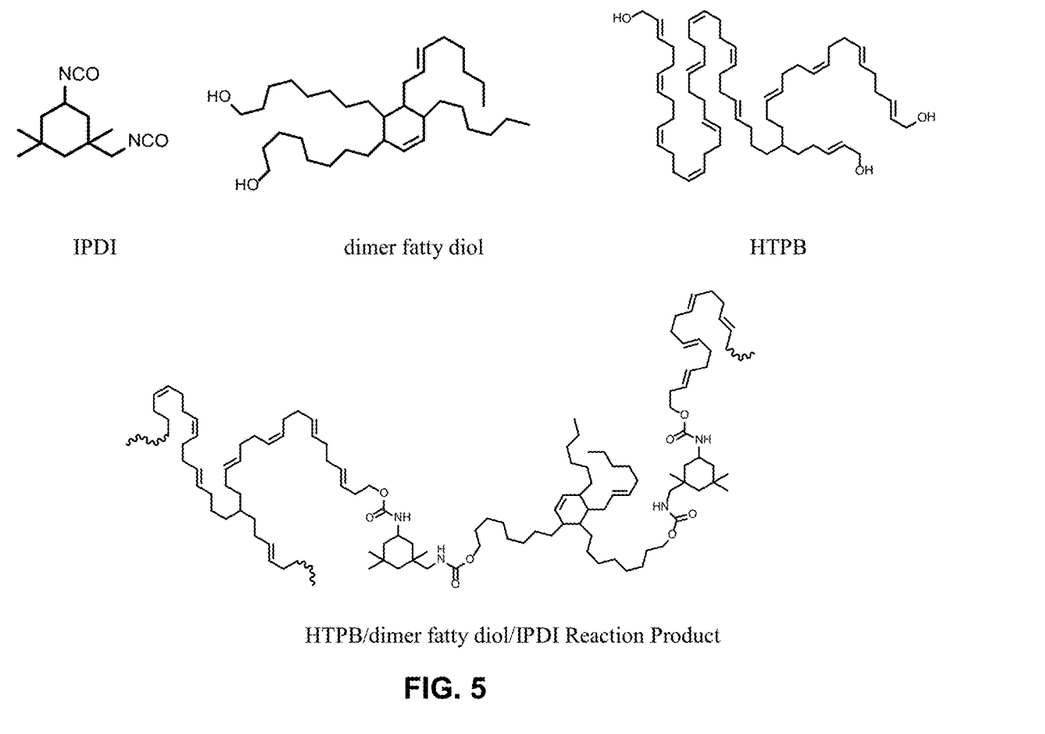
FIG. 5 shows a reaction product of a representative dimer fatty diol with a prepolymer (HTPB) and an isocyanate curative (IPDI) according to embodiments of the disclosure.

During cure, the hydroxyl groups on the dimer fatty diol react with isocyanate groups on the isocyanate curative. The isocyanate groups on the isocyanate curative also react with hydroxyl groups on the prepolymer. A representative reaction product of the prepolymer (e.g., HTPB), the dimer fatty diol, and the isocyanate curative (e.g., IPDI) is shown in FIG. 5, with the prepolymer (e.g., HTPB) represented by a simplified chemical structure. The reaction product includes HTPB bonded to IPDI, which is bonded to the dimer fatty diol, which is bonded to another IPDI molecule, which is bonded to another HTPB molecule. Since the dimer fatty diol has 2 hydroxyl groups, two IPDI molecules and two HTPB molecules are bonded for every dimer fatty diol molecule.

Figure 6:
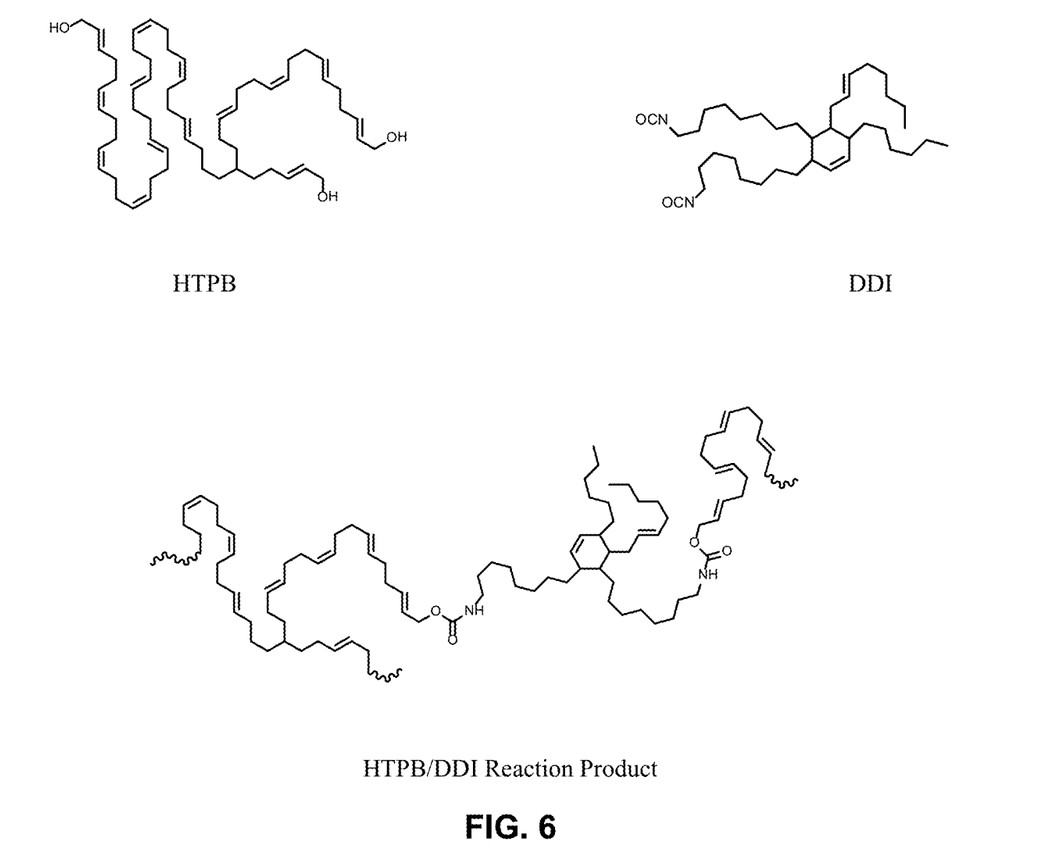
FIG. 6 shows a reaction product of DDI with the prepolymer (HTPB)

For comparison, a representative reaction product of HTPB and DDI is shown in FIG. 6, with the HTPB represented by a simplified chemical structure. As discussed above, the chemical structures of the dimer fatty diol and DDI are representative and not indicative of actual chemical structures since the dimer fatty diol and DDI are derived from natural fatty acids. The reaction product of HTPB, the dimer fatty diol, and IPDI (HTPB/dimer fatty diol/IPDI) is structurally similar to the reaction product of the HTPB and DDI (HTPB/DDI). The similarities between the two reaction products reduce the risk and increase the predictability of utilizing the dimer fatty diol in the sp. As shown in FIGS. 5 and 6, the HTPB/dimer fatty diol/IPDI reaction product includes four urethane groups, two times the number of urethane groups in the HTPB/DDI reaction product. With the higher number of urethane groups in the HTPB/dimer fatty diol/IPDI reaction product, a lowering of the crosslink density at equivalent isocyanate to hydroxyl (NCO:OH) ratios may be observed. However, the lower crosslink density may be compensated for by increasing the NCO:OH ratio. Alternatively, to compensate for the lower crosslink density, the functionality of the isocyanate curative may be increased from a diisocyanate to a triisocyanate or higher functionality, the functionality of the dimer fatty diol may be increased to a triol or higher polyol, or an additional polyol may be added to the precursor formulation.

Without being bound by any theory, it is believed that the small size of IPDI enables the effective bonding between the HTPB, the dimer fatty diol, and the IPDI to form the HTPB/dimer fatty diol/IPDI reaction product since the small molecule will minimize the amount of HTPB displaced by the additional, non-dimer fatty material. With its small size, the HTPB/dimer fatty diol/IPDI reaction product is very similar in chemical structure to the HTPB/DDI reaction product. It is also believed that the dimer fatty diol disrupts bonding with the HTPB. In the HTPB/dimer fatty diol/IPDI reaction product, the dimer fatty diol is also believed to function as a chain extender rather than as a curative.

The solid propellants according to embodiments of the disclosure may exhibit a comparable or reduced burn rate compared to conventional solid propellants including HTPB, AP, and DDI. The comparable or reduced burn rate is achieved without a substantial decrease in the performance of a rocket motor 20 including solid propellant 28. The mechanical and physical properties of the solid propellants according to embodiments of the disclosure may be also be comparable to conventional solid propellants including HTPB, AP, and DDI.

Utilizing the dimer fatty diol in the solid propellant according to embodiments of the disclosure may reduce the overall cost of the solid propellant since the dimer fatty diol is considerably less expensive than DDI. The cost of the dimer fatty diol is about $5.60/lb compared to about $80/lb for DDI. Therefore, the solid propellant including the dimer fatty diol is less expensive than a conventional propellant composition including DDI. In a solid propellant having the same weight fraction of the HTPB, dimer fatty diol, and IPDI as the weight fraction of HTPB and DDI in a conventional solid propellant and an equivalent overall isocyanate to hydroxyl ratio of approximately 0.85, the cost per pound of the solid propellant according to embodiments of the disclosure is $5.856/lb compared to $6.882/lb for the HTPB/DDI conventional sp. For a 100,000 pound booster motor, the savings are on the order of $103,000 per booster.

Including the dimer fatty diol in the solid propellant produced a similar trend in burn rate suppression to that observed with DDI in a conventional solid propellant. Utilizing the dimer fatty diol in the solid propellant according to embodiments of the disclosure may also provide mechanical tailorability and burn rate tailorability to the solid propellants due to the similarity between the reaction product of HTPB/IPDI/dimer fatty diol and the reaction product of HTPB/DDI.

Figure 7:
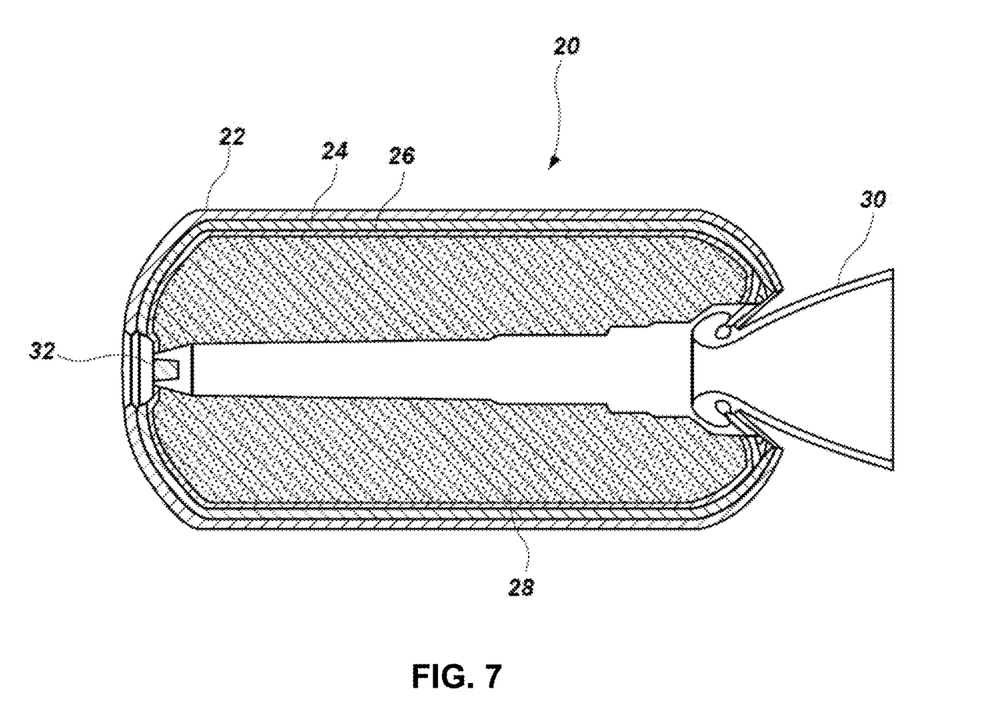
FIG. 7 is a cross-sectional view of a rocket motor including a solid propellant formed from a precursor formulation according to embodiments of the disclosure.

The solid propellant according to embodiments of the disclosure may be used in a rocket motor or other article configured to utilize a solid propellant having a low burn rate. By way of example only, the burn rate of the solid propellant is less than or equal to about 0.3 ips. As shown in FIG. 7, the rocket motor 20 includes a case 22 produced from a rigid, durable material, such as a metal or composite. The case 22 houses insulation 24 applied to an inner surface of the case 22, and present between the case 22 of the rocket motor 20. The case 22 also houses solid propellant 28, which combusts to provide the thrust necessary to propel the rocket motor 20. The rocket motor 20 also includes optional liner 26, which may be present between the insulation 24 and the propellant 28. Methods for loading the case 22 with the solid propellant 28, insulation 24, and liner 26, if present, are known in the art and, therefore, are not described in detail herein.

Nozzle assembly 30 is operatively associated with the case 22 to receive combustion products generated by combustion of the solid propellant 28 during use and operation of the rocket motor 20. The combustion products are expelled from the nozzle assembly 30, generating the desired thrust. The rocket motor 20 may also include an igniter 32 and other conventional components, which are not illustrated for simplicity and convenience. The rocket motor 20 may be configured to utilize a solid propellant having a low burn rate. Suitable rocket motors 20 include those having a high length to diameter ratio, such as an upper stage rocket, a kick motor, or an orbital insertion motor. By way of example only, the rocket motor 20 may be a graphite epoxy motor (GEM).

While the precursor formulation according to embodiments of the disclosure is described as being a precursor formulation of a solid propellant, a similar precursor formulation may be used in other DDI-containing compositions where burn rate suppression is desired. For instance, the precursor formulation according to embodiments of the disclosure may be used as a precursor to a gas generant composition or a pyrotechnic composition. By way of example only, the precursor formulation may be used as a gas generant composition to actuate a gas generant device used in the aerospace industry, such as a single-use gas generant device or an emergency gas generant device.

The following examples serve to explain embodiments of the disclosure in more detail. These examples are not to be construed as being exhaustive or exclusive as to the scope of this disclosure.

EXAMPLES

Example 1

Precursor Formulations

Precursor formulations including the components listed in Table 1 were prepared. Table 1 also includes the amount of each component. Each of Formulations A-G included PRIPOL® 2033 as the dimer fatty diol, while Formulation H lacked the dimer fatty diol and DDI. Each of the components was commercially available and was used as received. The components in Table 1 were added to an internal mixer and combined to produce the precursor formulations.

TABLE 1

Precursor Formulations

| Component | Form. A (wt %) | Form. B (wt %) | Form. C (wt %) | Form. D (wt %) | Form. E (wt %) | Form. F (wt %) | Form. G (wt %) | Form. H (wt %) |
|---|---|---|---|---|---|---|---|---|
| R45M (1% AO2246) | 7.8062 | 8.7967 | 8.7652 | 8.7338 | 9.4317 | 9.4045 | 9.3774 | 10.0438 |
| PRIPOL ® 2033 | 1.7500 | 1.0000 | 1.0000 | 1.0000 | 0.5000 | 0.5000 | 0.5000 | 0.0000 |
| DOS | 1.0000 | 1.0000 | 1.0000 | 1.0000 | 1.0000 | 1.0000 | 1.0000 | 1.0000 |
| WESTON ® 399 | 0.1200 | 0.1200 | 0.1200 | 0.1200 | 0.1200 | 0.1200 | 0.1200 | 0.1200 |
| Tepanol | 0.1000 | 0.1000 | 0.1000 | 0.1000 | 0.1000 | 0.1000 | 0.1000 | 0.1000 |
| DDI | 0.0000 | 0.0000 | 0.0000 | 0.0000 | 0.0000 | 0.0000 | 0.0000 | 0.0000 |
| IPDI | 1.2218 | 0.9813 | 1.0128 | 1.0442 | 0.8463 | 0.8735 | 0.9006 | 0.7342 |
| TPB | 0.0020 | 0.0020 | 0.0020 | 0.0020 | 0.0020 | 0.0020 | 0.0020 | 0.0020 |
| AP (320 mic) | 44.0000 | 44.0000 | 44.0000 | 44.0000 | 44.0000 | 44.0000 | 44.0000 | 44.0000 |
| AP (20 mic) | 25.0000 | 25.0000 | 25.0000 | 25.0000 | 25.0000 | 25.0000 | 25.0000 | 25.0000 |
| Al (25 mic) | 19.0000 | 19.0000 | 19.0000 | 19.0000 | 19.0000 | 19.0000 | 19.0000 | 19.0000 |

AO2246 = 2,2'-methylenebis-(4-methyl-6-tert-butylphenol)

Example 2

Burn Rates of the Solid Propellants

Precursor formulations B-H from Example 1 were cured, and the burn rate of each corresponding solid propellant was determined by conventional techniques to investigate the effect of dimer fatty diol amount on the burn rate. The burn rate (measured in inches per second (ips)) of each of the solid propellants is shown in Table 2. Burn rates for control solid propellants (containing HTPB and DDI) are shown in Table 3 for comparison. Some of the control solid propellants included HTPB (9.8 wt %-9.98 wt %), DOS (1 wt %), tepanol (0.1 wt %), TPB (0.002 wt %), WESTON® 399 (0.12 wt %), aluminum (19 wt %), AP (69 wt %), IPDI (0.58 wt %-0.70 wt %), and DDI (0.1-0.4 wt %). Other control solid propellants included HTPB (9.53 wt %-9.88 wt %), DOS (1 wt %), tepanol (0.1 wt %), TPB (0.005 wt %), aluminum (19 wt %), AP (69 wt %), IPDI (0.39 wt %-0.70 wt %), and DDI (0 wt %-0.75 wt %). The solids content, cure ratio (moles NCO of the isocyanate curative/moles OH of the dimer fatty diol), and wt % of PRIPOL® 2033 or DDI are also shown in Tables 2 and 3. The control solid propellants also differed in the amount of fine particle size AP used. One set of control solid propellants included 20% fine AP while the other set of control solid propellants included 25% fine AP.

TABLE 2

Burn Rates of the Solid Propellants Including PRIPOL ® 2033

| Property | Form. B | Form. C | Form. D | Form. E | Form. F | Form. G | Form. H |
|---|---|---|---|---|---|---|---|
| NCO/OH | 0.87 | 0.9 | 0.93 | 0.87 | 0.9 | 0.93 | 0.9 |
| Solids loading | 88 | 88 | 88 | 88 | 88 | 88 | 88 |
| PRIPOL ® 2033 (%) | 1 | 1 | 1 | 0.5 | 0.5 | 0.5 | 0 |
| Burn rate (ips) | 0.2949 | 0.2966 | 0.291 | 0.314 | 0.3 | 0.3079 | 0.3551 |

TABLE 3

Burn Rates of Control Solid Propellants Including DDI

| Property | DDI Form. 1 | DDI Form. 2 | DDI Form. 3 |
|---|---|---|---|
| NCO/OH | 0.912 | 0.912 | 0.912 |
| Solids loading | 88 | 88 | 88 |
| % DDI | 0.25 | 0.1 | 0.4 |
| Burn rate (ips) | 0.3097 | 0.3337 | 0.291 |

Figure 8:
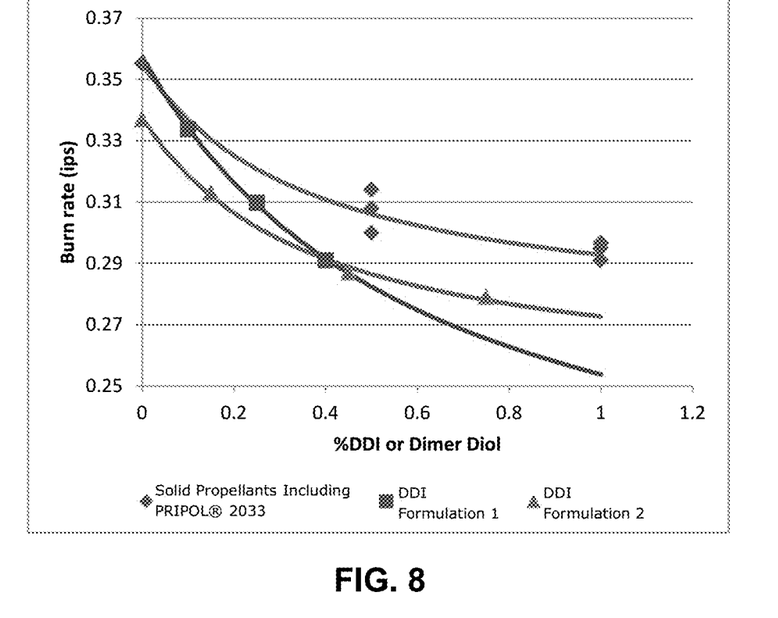
FIG. 8 is a plot of burn rate (ips) as a function of dimer fatty diol or DDI content for solid propellants according to embodiments of the disclosure.

As shown in FIG. 8, the burn rate of the solid propellants including PRIPOL® 2033 exhibited a response trend corresponding to the dimer fatty diol amount. The response to the inclusion of the dimer fatty diol in the solid propellants including PRIPOL® 2033 was nearly identical to the trend observed with DDI amount in the control solid propellants. The burn rate reduction scaled with amount of the dimer fatty diol as it does with DDI and the scale of the effect was nearly identical. Any difference in the response trend is likely due to the difference in amount of fine AP included in the solid propellants. Therefore, the inclusion of dimer fatty diol in the solid propellants is similar in trend and magnitude to that of inclusion of DDI.

Example 3

Processing Properties

Figure 9:
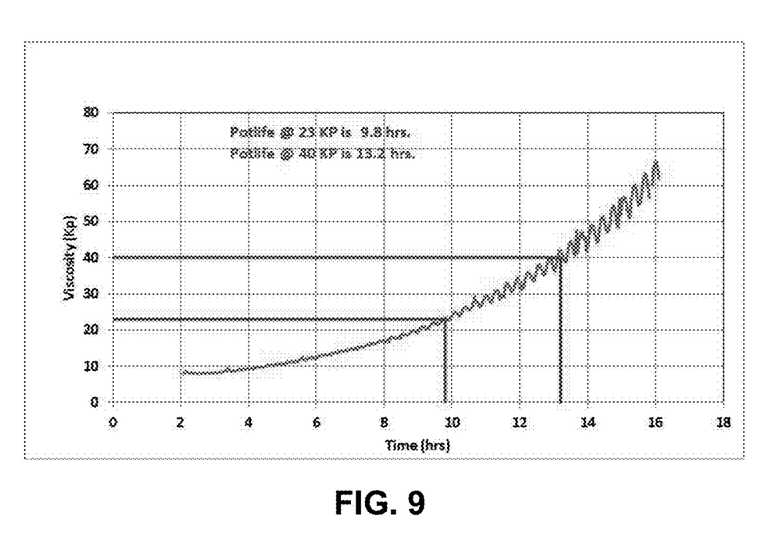
FIG. 9 is a plot of viscosity (Kp) as a function of time for precursor formulations according to embodiments of the disclosure.

The potlife of Formulation A from Example 1 was determined by conventional techniques. Formulation A had the highest amount of dimer fatty diol and highest cure ratio and is expected to be indicative of a worst case scenario. The potlife of Formulation A was shorter than that for the control solid propellant though still acceptable as shown in FIG. 9. Formulation A cured in about 8 days.

Figure 10:
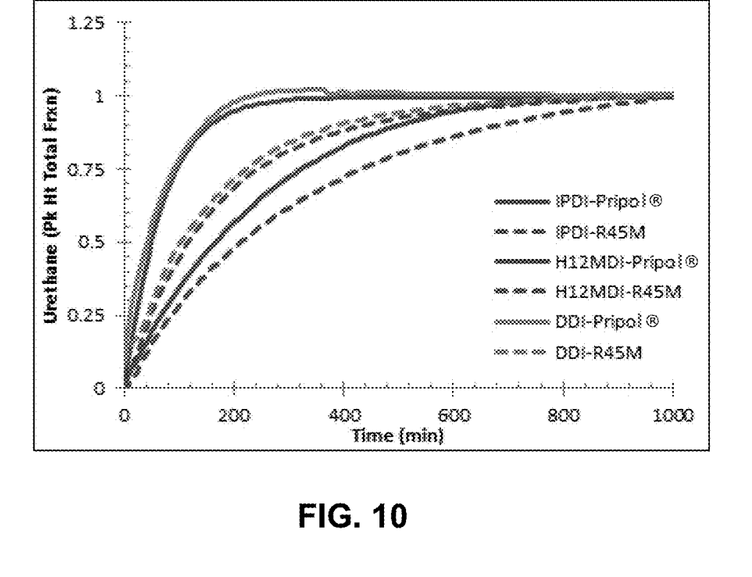
FIG. 10 is a plot of urethane peak height as a function of time for reactions of each of IPDI, H12MDI, and DDI with the dimer fatty diol or HTPB.

To adjust the potlife of the solid propellant, H12MDI was investigated as the curative instead of IPDI. The reaction of IPDI, DDI, or H12MDI with either the dimer fatty diol (PRIPOL® 2033) or HTPB (R45M) was monitored by Fourier Transform Infrared (FTIR) spectroscopy. The cure ratio was maintained at about 10:1 to minimize diffusional and asymmetric reactivity effects. As shown in FIG. 10, the increase in the urethane peak over time at 135° F. indicates that both IPDI and DDI show high reactivity towards the dimer fatty diol (PRIPOL® 2033) and moderate reactivity towards HTPB. The H12MDI showed moderate reactivity towards both the dimer fatty diol (PRIPOL® 2033) and HTPB, suggesting that H12MDI may be used in whole or in part for IPDI to moderate the potlife of the propellant including the dimer fatty diol. Additionally, reduced amounts of cure catalyst (e.g., TPB) and/or reduced temperature may be used to lengthen potlife.

Example 4

Mechanical Properties

Stress and strain properties of Formulations B-H of Example 1 were determined. The stress and strain properties were determined by conventional techniques, with the reported stress based on the "true corrected max stress" and the reported strain based on the "true corrected max strain." The stress, strain, modulus, and Shore A properties are shown below in Table 4.

TABLE 4

Stress, Strain, Modulus, and Shore A Properties

| Property | Form. B | Form. C | Form. D | Form. E | Form. F | Form. G | Form. H |
|---|---|---|---|---|---|---|---|
| Stress (psi) | N/A | 36.3 | 87.8 | 52.6 | 72.2 | 130 | 128 |
| Strain (5) | N/A | 35.9 | 45.3 | 47.5 | 51.6 | 47.3 | 50.2 |
| Modulus (psi) | N/A | 685 | 872 | 373 | 552 | 1150 | 600 |
| Shore A | N/A | 22.7 | 49 | 30.3 | 43.3 | 61.7 | 54.7 |

With increasing cure ratios at any given dimer diol concentration, the strength (max stress) was increased as the cure became more complete. Surprisingly, a decreasing degree of apparent cure was observed with increasing dimer diol concentration at any given cure ratio. Without being bound by any theory, it is believed that this may be due to decreased crosslink density as the dimer fatty diol is difunctional but displaces HTPB that has an average functionality of around 2.4. This, however, would not be expected to result in as significant a drop in max stress as was demonstrated. In any event, it was clear that acceptable mechanical properties were achieved with concentrations of dimer diol lower than 1.0% by adjusting the cure ratio. Curatives with functionality greater than 2 may prove useful in achieving improved mechanical properties.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the following appended claims and their legal equivalents.

What is claimed is:

1. A precursor formulation, comprising, before cure:
a hydroxyl-terminated polybutadiene (HTPB) prepolymer or a hydroxyl-terminated polyether (HTPE) prepolymer, an oxidizer, a dimer fatty diol, and an isocyanate curative, the dimer fatty diol comprising from 30 carbon atoms to 40 carbon atoms, a cyclohexenyl group or a bicycloalkenyl group, and two hydroxyl-terminated hydrocarbon chains bonded to the cyclohexenyl group or the bicycloalkenyl group.

2. The precursor formulation of claim 1, wherein the dimer fatty diol comprises an alkyl group, an alkenyl group, a cycloalkyl group, a cycloalkenyl group, a bicycloalkyl group, a bicycloalkenyl group, or an aromatic group, two hydroxyl-terminated hydrocarbon chains bonded to the alkyl group, the alkenyl group, the cycloalkyl group, the cycloalkenyl group, the bicycloalkyl group, the bicycloalkenyl group, or the aromatic group, and at least one additional hydrocarbon chain bonded to the alkyl group, the alkenyl group, the cycloalkyl group, the cycloalkenyl group, the bicycloalkyl group, the bicycloalkenyl group, or the aromatic group.

3. The precursor formulation of claim 1, wherein each of the two hydroxyl-terminated hydrocarbon chains independently comprises from six carbon atoms to ten carbon atoms.

4. The precursor formulation of claim 2, wherein the at least one additional hydrocarbon chain comprises from six carbon atoms to ten carbon atoms.

5. The precursor formulation of claim 2, wherein the at least one additional hydrocarbon chain comprises two or more additional hydrocarbon chains and each of the additional hydrocarbon chains independently comprises from six carbon atoms to ten carbon atoms.

6. The precursor formulation of claim 1, wherein the alkyl group, the alkenyl group, the cycloalkyl group, the cycloalkenyl group, the bicycloalkyl group, the bicycloalkenyl group, or the aromatic group comprises a cyclohexyl group or a cyclohexenyl group.

7. The precursor formulation of claim 1, wherein the dimer fatty diol comprises or a combination of and 8. The precursor formulation of claim 1, wherein the dimer fatty diol is present in the precursor composition at from about 0.01% by weight to about 2.0% by weight.

9. The precursor formulation of claim 1, further comprising a fuel.

10. The precursor formulation of claim 1, wherein the precursor composition comprises HTPB, ammonium perchlorate, the dimer fatty diol, and isocyanate curative (IPDI).

11. The precursor formulation of claim 10, further comprising aluminum.

12. The precursor formulation of claim 1, wherein the precursor composition comprises HTPE, ammonium perchlorate, the dimer fatty diol, and IPDI.

13. The precursor formulation of claim 1, wherein the solids content is greater than or equal to about 87%.

14. A solid propellant comprising:
a reaction product of a hydroxyl-terminated polybutadiene (HTPB) prepolymer or a hydroxyl-terminated polyether (HTPE) prepolymer, a dimer fatty diol, and an isocyanate curative, the dimer fatty diol comprising from 30 carbon atoms to 40 carbon atoms, a cyclohexenyl group or a bicycloalkenyl group, and two hydroxyl-terminated hydrocarbon chains bonded to the cyclohexenyl group or the bicycloalkenyl group; and
an oxidizer.

15. The solid propellant of claim 14, wherein the reaction product comprises four urethane groups.

16. A rocket motor, comprising:
a case and a solid propellant in the case, the solid propellant comprising:
a reaction product of a hydroxyl-terminated polybutadiene (HTPB) prepolymer or a hydroxyl-terminated polyether (HTPE) prepolymer, a dimer fatty diol, and an isocyanate curative, the dimer fatty diol comprising from 30 carbon atoms to 40 carbon atoms, a cyclohexenyl group or a bicycloalkenyl group, and two hydroxyl-terminated hydrocarbon chains bonded to the cyclohexenyl group or the bicycloalkenyl group; and an oxidizer.

17. The rocket motor of claim 16, wherein the rocket motor comprises an upper stage rocket, a kick motor, or an orbital insertion motor.

18. A method of reducing a burn rate of a solid propellant, comprising:

combining a dimer fatty diol with a hydroxyl-terminated polybutadiene (HTPB) prepolymer or a hydroxyl-terminated polyether (HTPE) prepolymer, an oxidizer, and an isocyanate curative to form a precursor formulation, the dimer fatty diol comprising from 30 carbon atoms to 40 carbon atoms, a cyclohexenyl group or a bicycloalkenyl group, and two hydroxyl-terminated hydrocarbon chains bonded to the cyclohexenyl group or the bicycloalkenyl group; and curing the precursor formulation to form a solid propellant.

19. The method of claim 18, wherein combining a dimer fatty diol with an HTPB prepolymer or an HTPE prepolymer, an oxidizer, and an isocyanate curative comprises combining the dimer fatty diol having from thirty carbon atoms to forty carbon atoms, two hydroxyl-terminated hydrocarbon chains bonded to the cyclohexenyl group or the bicycloalkenyl group, and at least one additional hydrocarbon chain bonded to the cyclohexenyl group or the bicycloalkenyl group with the HTPB prepolymer or the HTPE prepolymer, the oxidizer, and the isocyanate curative.

20. The method of claim 18, wherein combining a dimer fatty diol with an HTPB prepolymer or an HTPE prepolymer, an oxidizer, and an isocyanate curative comprises combining a dimer fatty diol comprising or a combination of and with the HTPB prepolymer or the HTPE prepolymer, oxidizer, and isocyanate curative.

* * * * *